United States Patent [19]

Martinelli et al.

[11] 4,199,805
[45] Apr. 22, 1980

[54] MULTIPHASE CAPACITOR DIODE VOLTAGE MULTIPLIER

[75] Inventors: Robert M. Martinelli, Torrance; Allan F. Ahrens, Saugus, both of Calif.

[73] Assignee: Hughes Aircraft Company, Culver City, Calif.

[21] Appl. No.: 853,169

[22] Filed: Nov. 21, 1977

[51] Int. Cl.² ............................................. H02M 7/00
[52] U.S. Cl. ...................................................... 363/60
[58] Field of Search ............................... 307/109, 110; 363/59–61

[56] References Cited

U.S. PATENT DOCUMENTS

| 3,525,031 | 8/1970 | King | 363/61 |
| 4,050,005 | 9/1977 | Maginness | 363/59 |

FOREIGN PATENT DOCUMENTS 423228 9/1974 U.S.S.R. ..................................... 363/60

OTHER PUBLICATIONS

Journal of Physics E; Scientific Instruments, "Power Supplies for Continuous Gas Lasers and Similar Discharges", C. B. Wheeler, vol. 4, No. 3, Mar., 1971, pp. 159–164.

Primary Examiner—William M. Shoop
Attorney, Agent, or Firm—Elliott N. Kramsky; W. H. MacAllister

[57] ABSTRACT

A multiphase capacitor diode voltage multiplier for high power applications. A multiphase circuit comprising N strings of diode-capacitor arrays in M multiplier stages receives N alternating voltage inputs, each varying in phase, from a power stage. The multiphase multiplier circuit configuration enables current sharing among the N strings to reduce component stress.

13 Claims, 9 Drawing Figures

MULTIPHASE CAPACITOR DIODE VOLTAGE MULTIPLIER

BACKGROUND OF THE INVENTION

1. Field of the Invention

The present invention relates to means for generating high voltage and in particular to dc-dc converters having a large power-handling capacity.

2. Description of the Prior Art

High power voltage multiplication by means of conventional transformers, although adequate for many uses, is often found disadvantageous for applications involving a weight penalty. Such applications are numerous and encountered most obviously in flight and space systems, including avionics, airborne radar and satellite high voltage supply. Transformers are physically limited to relatively low frequency operation, generally up to 50 kHz, by stray capacitances among transformer windings and between the windings and core. Transformer weight and operating frequency are in turn inversely related, reflecting the increased amount of core required to contain the increased magnetic flux of the lower operating frequencies.

A solution to the frequency limitation (and the weight problem associated therewith) has been the use of the full or half wave single phase capacitor-diode voltage multiplier (CDVM). This multiplier commonly comprises a number of identical cascaded stages of capacitor-diode "cells". Voltages maintained upon the charged capacitors add serially with the high level input voltage to produce a multiple of the input. A number of limitations become evident when higher power systems attempt to utilize the single phase CDVM. Present day components limit the practical power capability of the single phase CDVM. Increased power demands have been occasioned by developments in the traveling wave tube, ion engine and cathode ray tube technologies, for example. Present day capacitors of metallized paper, metallized film and ceramic dielectrics often require an unacceptably large design to handle large single phase CDVM high power currents. Although developments in the areas of polycarbonate and polysulfone dielectrics (see, for example, "Technological Development of High Energy Density Capacitors", Robert D. Parker, NAS 3-18925 (1976)) may lead to smaller films of given capacity, capacitor size constraints will always place a limit upon the power handling capability of the CDVM.

Attempts have been made to increase high frequency voltage multiplier power handling capability by, for example, the parallel grouping of a number of single phase, M-stage CDVM's. Problems have been found to arise from such combination with regard to current sharing among the various CDVMs, resulting in suboptimal design.

SUMMARY OF THE INVENTION

According to the preferred embodiment of the invention there is provided a multiphase voltage multiplier which comprises means for producing an output comprising at least two voltages, each of said voltages alternating between a high level and a low level and differing in phase, a capacitor diode multiplier circuit having at least two input channels and an output junction, said multiplier circuit comprising N circuit strings, each of said strings being in electrical connection with an input channel and the output junction and each of said input channels of said circuit being in electrical connection with said means. A number of alternative generalized multiplier circuit configurations are presented within the scope of the invention. For each alternative configuration, the multiplier circuit comprises M stages. Each stage has an input and an output.

One exemplary embodiment of the voltage multiplier circuit, designated the ring, includes, inter alia, an output diode connecting the final stage of each string to the output junction. Designating any one of the strings j and any one of the stages i, the output of stage i of circuit string j is in electrical connection with the input of stage (i+1) of circuit string j. Each stage i of each circuit string j of the ring comprises (1) a capacitor connected across the input and the output of stage i of string j, (2) a diode connected from the input of stage i of string j to the input of stage (i+1) of string (j+1) and (3) a diode connected from the input of stage i of string N to the input to stage (i+1) of string 1.

The voltage multiplier constructed as above mentioned and the other multi-stage embodiments disclosed have the advantage of attaining the high frequency voltage multiplication of the single phase CDVM or any parallel combination thereof at a much greater power per weight ratio.

It is, therefore, the object of the present invention to provide a high frequency, lightweight and efficient voltage multiplier circuit of the capacitor-diode type capable of handling higher power levels than the single phase CDVM with presently available components.

Other objects, advantages and novel features of the invention will become apparent from the following detailed description of the invention when considered in conjunction with the accompanying drawings wherein:

DESCRIPTION OF THE PREFERRED EMBODIMENTS

Figure 1A:
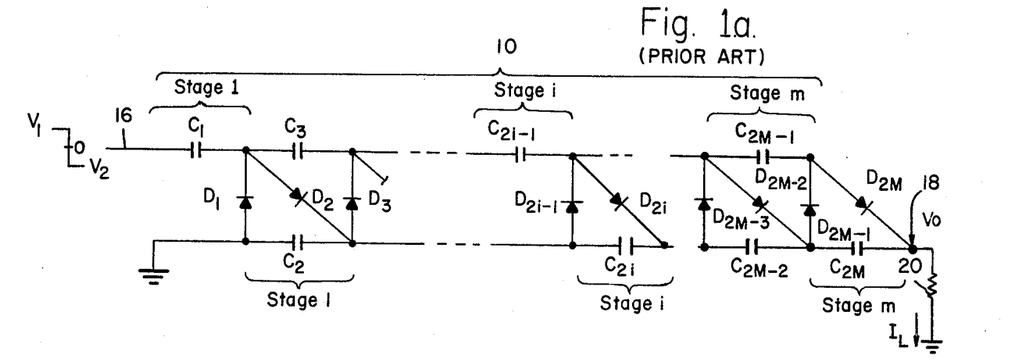
FIG. 1a is a circuit diagram of the prior art single phase, M-stage CDVM.

Turning now to the drawings, there is shown in FIG. 1a the prior art single phase multistage voltage capacitor-diode multiplier (CDVM) 10. This single phase CDVM is of the type believed first disclosed by Cockcraft and Walton in 1932 (D. Cockcraft and E. T. S. Walton, "Experiments With High Velocity Positive Ions-(1) Further Developments in the Method of Obtaining High Velocity Positive Ions", Proc. Roy. Soc., Vol. 136A, pp. 619–630 (1932)) and does not comprise the present inventive concept but is illustrated for comparison throughout and to facilitate explanation of the purpose and operation of the present invention. In the multistage embodiment of FIG. 1a the single phase CDVM 10 comprises a plurality M of multiplier stages i, each stage comprising a characteristic "cell" of two capacitors and diodes as described infra.

Each multiplier stage or cell i is seen to comprise a pair of capacitors $C_{2i-1}$, $C_{2i}$ and a pair of diodes, $D_{2i-1}$ and $D_{2i}$. It is well known in the art that the capacitors of the single phase CDVM 10, when chosen for equal peak to peak ripple voltages on all capacitors, are commonly scaled $C_{2i} = C_{2i-1} = (M-i+1)C_{2M-1}$ to achieve equality of ripple voltage from stage to stage. Such scaling is illustrated for the single phase CDVM 14 of FIG. 1b, which is designed for an output voltage ($V_o$) multiplication of $V_1 + 3(V_1 + V_2)$.

The embodiment of FIG. 1a acts as a half-wave rectifier, multiplying the alternating voltage input at channel 16 to a level $M(V_1 + V_2)$ where $V_1$ and $V_2$ are, respectively, the positive-going and negative-going levels of input voltage. (An output voltage $V_o$ of 4 ($V_1 + V_2$) could have been obtained by the single phase CDVM of FIG. 1b with the addition of one diode and one capacitor at its input 16, extending the CDVM leftward by one-half of one CDVM "cell".) The diodes $D_{2i-1}$, $D_{2i}$ are arranged to conduct charging current to capacitors $C_{2i-1}$, $C_{2i}$ during alternate half cycles of the input voltages ($V_1, -V_2$). The charge is transferred by effectively paralleling capacitors $C_{2i-1}$, $C_{2i}$. After appropriate iterations (settling time) each capacitor of the single phase CDVM of FIG. 1(a) is charged to a steady state dc voltage of $V_1 + V_2$ (with the exception of $C_1$ which is charged to $V_2$). Voltage $V_o$ taken at output junction 18 thus comprises the serial combination of the high level of input voltage $V_1$, the $V_2$ across $C_1$ and the (M−1) capacitor steady state dc voltages $(V_1 + V_2)$ or $M(V_1 + V_2)$ as stated above. Output current $I_L$ is supplied continuously to an interfacing load 20 by discharging capacitor $C_{2M}$ which is supplied charging current during alternate half cycles through $D_{2M}$ after the CDVM has achieved steady state (i.e., capacitor voltages as stated supra).

Figure 2:
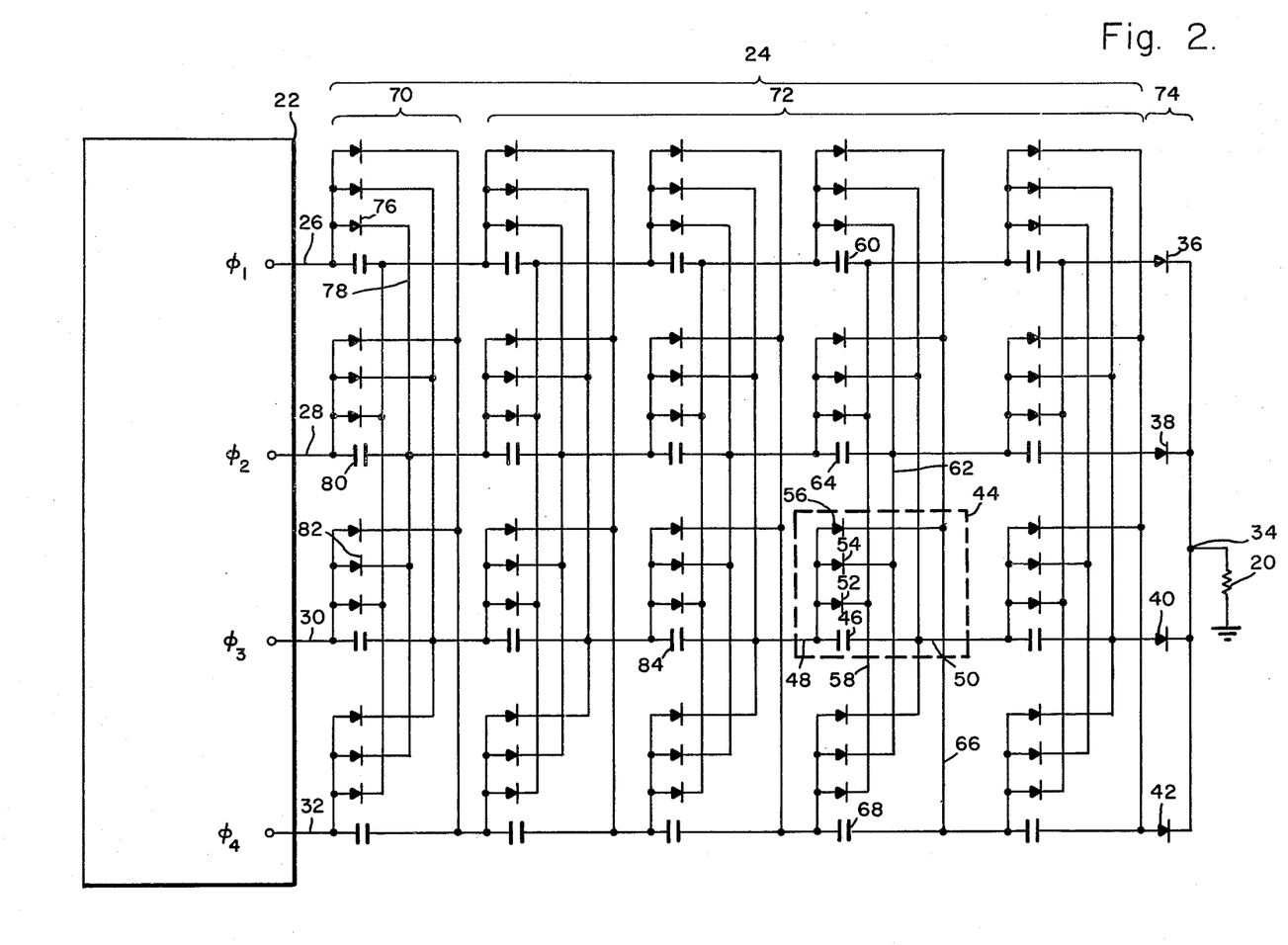
FIG. 2 is a circuit diagram of a four-phase, five-stage (matrix-type) CDVM of the present invention.
Figure 3:
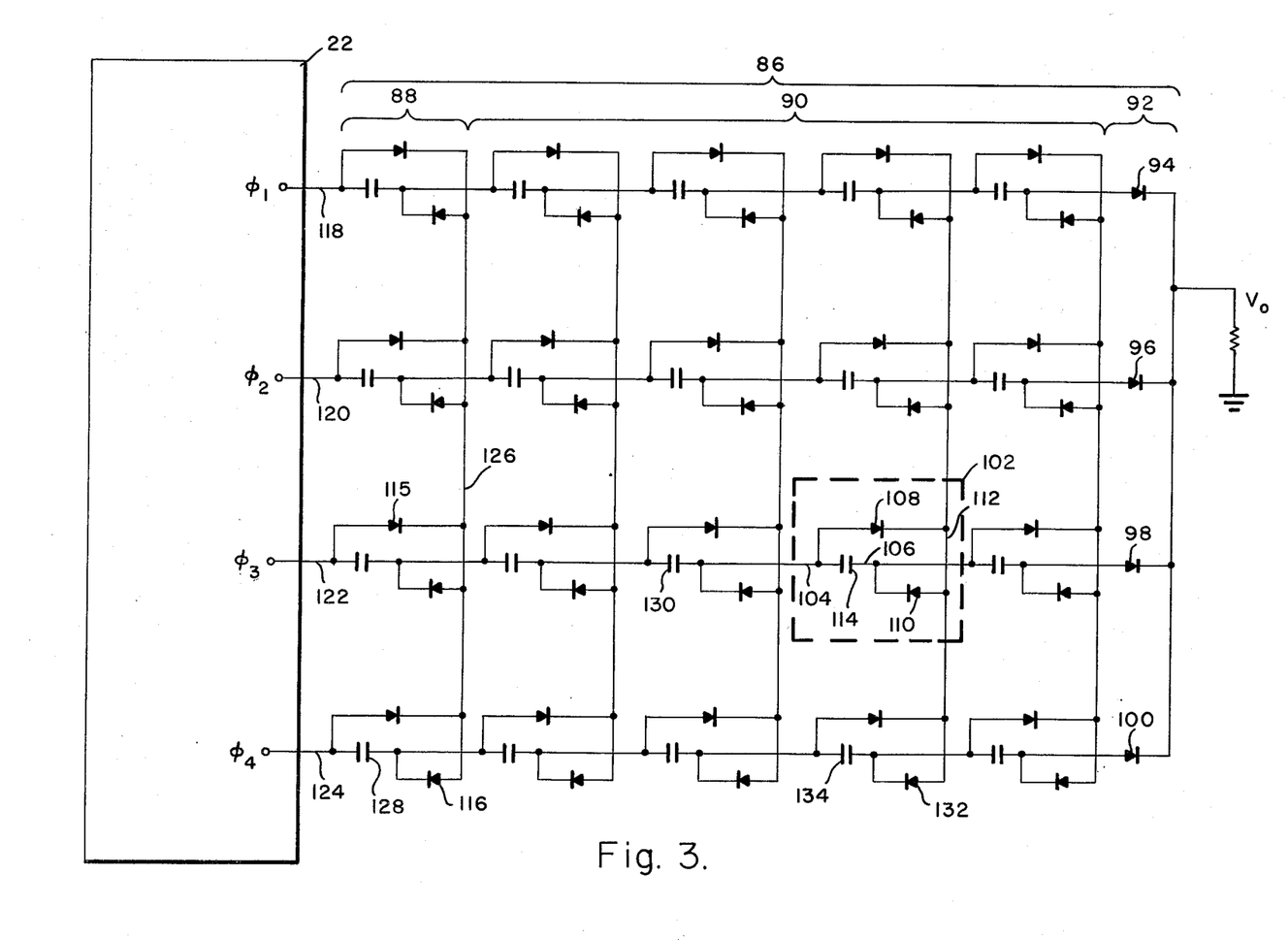
FIG. 3 is a circuit diagram of an alternative configuration of the four-phase, five-stage CDVM of the present invention.
Figure 4:
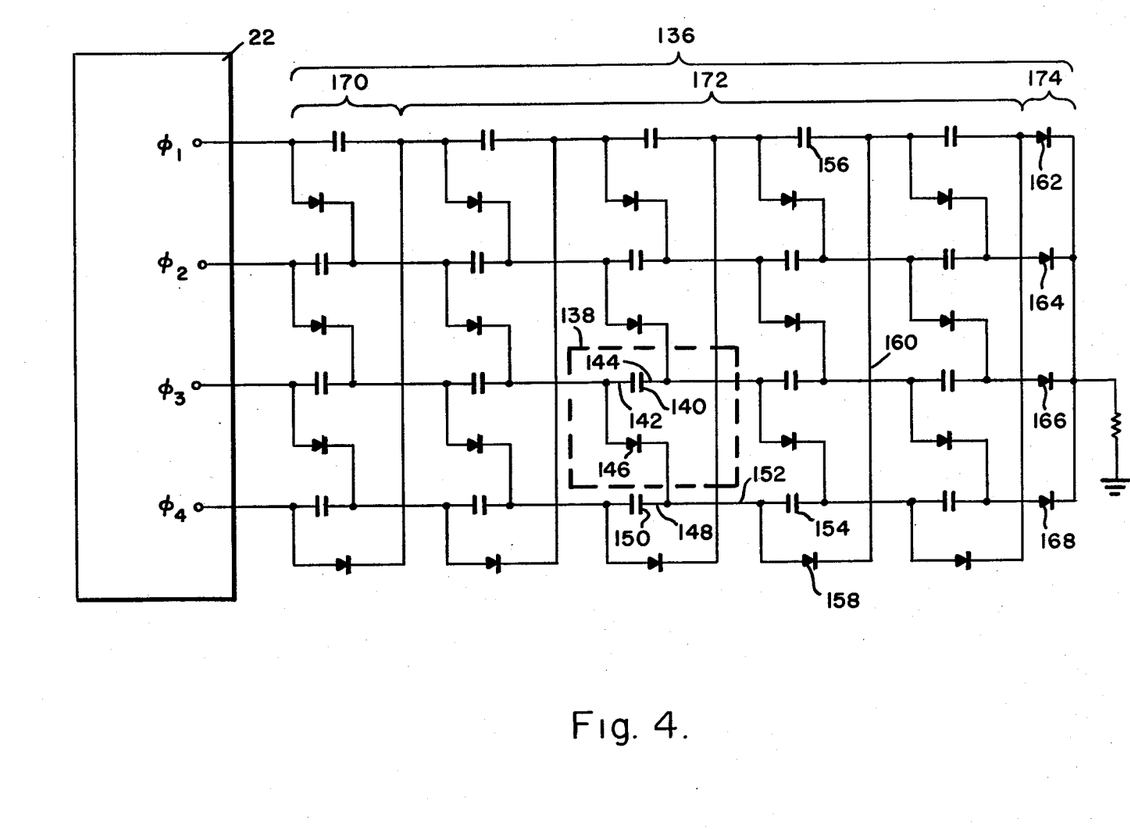
FIG. 4 is a circuit diagram of a four-phase, five-stage (ring-type) CDVM of the present invention.

The N phase CDVM which comprises the present invention is shown in three alternative preferred embodiments in FIGS. 2 through 4. Each embodiment is illustrated at four-phase-by-five-stage scale. Each configuration may be generalized to N-by-M scale without changing the operation or essential features of the particular embodiment. In each configuration, an alternating level voltage having a positive-going $V_1$ and negative-going $V_2$ is input from power stage 22 with a phase shift or difference of (360÷4) 90 degrees to the four input channels of a five-stage CDVM. In the general case, power stage 22 inputs N phased voltages shifted by (360÷N) to N input channels.

The power stage 22 is of a standard design for compatibility with the multiphase CDVM. It may typically comprise a standard logic circuit for phase generation, a transistor chopper having dc supplies $V_1$, $V_2$ for generation of alternating level voltages and a transistor driver to isolate the logic from the chopper circuitry. A three-phase power stage 22 adaptable to and consistent with the multiphase CDVM of the present invention is shown (as FIG. 2) in "RCA Power Transistors: 1975 Data Book", at page 786.

The four-phase, five-stage matrix 24 is illustrated in FIG. 2. The four out-of-phase alternating voltages are input from the power stage 22 to the matrix 24 through voltage input channels 26 (phase 1), 28 (phase 2), 30 (phase 3) and 32 (phase 4). EAch of the input channels is associated with one (horizontal) string of capacitors connecting the input channel to the output junction 34 through M identical capacitor-diode arrays and through one of output diodes 36 through 42. The arrays may be grouped into a plurality of identical "cells" characteristic of the matrix 24. It will be noticed from the discussion to follow that the polarity of all diodes, shown as positive in FIG. 2, could be reversed without altering the operation, outputs, features and advantages of the present invention (with the exception of a sign reversal of the output voltage $V_o$). Such reversal of diode polarity will not affect any of the multiphase CDVM configurations of FIGS. 2 through 4 provided that all diodes are simultaneously reversed in polarity within any given configuration.

Each capacitor-diode "cell" (any cell may be identified as the stage i segment of the phase j string of the matrix) can be seen from FIG. 2 to repeat a characteristic pattern. Phase 3, stage 4, cell 44 is typical of the matrix 24. Cell 44 comprises a capacitor 46 connected across the cell's input 48 and output 50 and three diodes 52, 54 and 56 each connecting the input 48 of cell 44 to the output of one other cell of stage 4 through a bus. Thus, diode 52 provides a current path from the input 48 of cell 44 to the output side of phase 1, stage 4 capacitor 60 through bus 58, diode 54 provides a current path from input 48 through bus 62 to the output side of phase 2, stage 4 capacitor 64 and diode 56 provides a path from input 48 to the output side of phase 4, stage 4 capacitor 68 through bus 66. The operation of the matrix 24 may be analyzed in terms of three characteristic regions. These regions comprise, from left to right of FIG. 2: input region 70 of four stage 1 diode-capacitor cells each essentially identical to cell 44 and each interfacing a phased output from power stage 22; intermediate region 72 comprising stages 2 through 5, each stage comprising four matrix cells essentially identical to cell 44; and output region 74 comprising the four output diodes 36, 38, 40 and 42.

In steady state operation, the regions of the matrix interact thusly: at any given moment, j voltage inputs will be phased high ($V_1$) and (4−j) will be phased low (−$V_2$). All diodes of region 70 which connect a high input from voltage driver 22 through an input channel to the output side of a stage 1 matrix cell having low phased voltage will conduct charging current from the high input channel to the low phased input channel through the capacitor of the low input string of stage 1.

For example, assuming the phase 1 and phase 3 outputs of power stage 22 to be high ($V_1$) while phase 2 is low (−$V_2$), charging currents will flow in region 70 from input channel 26 through diode 76 and bus 78 and from input channel 30 through diode 82 and bus 78 to charge capacitor 80. In this manner, the nondischarging, low input string capacitors of region 70 will each gain an increment of charge equal to that lost during previous conduction (i.e., the ripple voltages of the stage 1 capacitors are recharged). The complete interconnection of the matrix 24 capacitors of region 70 assures that each stage 1 capacitor on a low phased capacitor string will gain charge during this low half cycle. Moving to region 72, the intermediate stage capacitors of the low phased capacitor strings will be charged through the discharging capacitors of the preceding stage of the high phased intermediate stage capacitor strings. This forward transfer of charge from stage to stage (again for the purpose of replenishing the ripple voltage level on discharged capacitors) is accomplished by means of the intermediate region 72 current paths which exist for example through the discharging stage 3 capacitor 84 (assuming a high phase 3 voltage) through the stage 4 diodes of the string which interconnect with the output of a low phased capacitor. If all other capacitors were phased low, charge would thereby be transferred from capacitor 84 to capacitors 60, 64 and 68 by means of the diodes and buses of matrix cell 44 as indicated supra. (Any properly scaled capacitor when "discharged" retains a large dc voltage due to its relatively large capacitance. It is depleted only of its relatively small ripple voltage component.) The process is reversed when the phase relationships are altered, which will occur regularly as long as an even phase spacing is maintained. The stage 5 capacitor of each string, when high, will discharge its ripple voltage through its associated output diode of region 74 to ground through the load 20 during its discharge period. The sum of all high strings' output currents at any given time constitutes the load current $I_L$. Assuming a steady state dc voltage, $V_1+V_2$, exists on each capacitor giving the multiphase CDVM the desired five-stage multiplication ratio, steady state will be maintained by the current flows resulting from the interaction of the four phased inputs from power stage 22 and the matrix 24 of FIG. 2 without regard to phase rotation. That is, although all four voltage inputs are assumed to vary by 90 degrees, adjacent phases may differ by any multiple of 90 degrees.

Thus, it can be seen that the matrix 24 of FIG. 2 allows the transfer of charge from stage to stage to maintain steady state charge upon the matrix 24 capacitors. Each matrix cell requires three (general case, $(N-1)$) diodes in input region 70 to complete all stage 1 interconnections. Intermediate region 72 of the matrix comprises four (general case, $(M-1)$) cells per phase. As each cell of region 72 requires three (general case, $(N-1)$ diodes each phased voltage feeds into a string of, when the output diodes of region 74 are accounted for, 16 diodes (general case, $M(N-1)+1$). The total diode count (64) is arrived at by multiplying by the number of phases. The generalized matrix requires a total of $M(N(N-1))+N$ diodes.

An economy of parts (diodes) may be effected by limiting the interconnection between the capacitors to create a "partial matrix" CDVM. Such a circuit may be sensitive to phase rotation and thus the power stage 22 must be restricted to output a specified phased voltage sequence unlike the full matrix 24 as shown in FIG. 2.

Turning now to FIG. 3, there is shown an alternative CDVM 86 of the present invention. With reference to the prior discussion of the multiphase CDVM matrix of FIG. 2, it can be seen that this multiplier may likewise be divided into three distinct regions 88, 90, and 92 corresponding to the input, intermediate and output regions of the matrix 24. In input region 88, four identical capacitor-diode cells forming the first of five stages of cells commute with the four phased outputs of power stage 22. Intermediate region 90 contains four stages of four cells each. The cells of region 88 have capacitor-diode relationship identical to that of the region 90 cells. Output diodes 94, 96, 98, 100 comprise output region 92. All cells of this multiphase CDVM comprise the same capacitor-diode arrangement as that of phase 3, stage 4 cell 102. The input side 104 of cell 102 is connected through diode 108 to a bus 112 while a diode 110 connects bus 112 to the output 106 of the cell 102. Capacitor 114 is connected across the input 104 and output 106 of the cell 102. It is readily apparent that the circuit of FIG. 3 achieves significant component economy over the matrix array. However, such economy is achieved at the expense of an extra diode forward voltage drop per stage due to this configuration's two (as opposed to the $(N-1)$ diodes required per cell by the matrix 24) oppositely oriented diodes per cell. Input region 88 contains a total of 8 (in general, 2 N) diodes, intermediate region 90 contains a total of 32 (in general, 2 N(M−1)) diodes and output region 92 has 4 (in general, N) diodes for a circuit total of 44 (in general, N(2 M+1)) diodes per multiphase CDVM circuit 86 as shown in FIG. 3.

In operation, the input-to-node 126 diodes of the first stage such as 115 (assuming phase 3 high) act in input region 88 in conjunction with the bus 126-to-output diodes such as 116 (assuming phase 4 low) of stage 1 to create a current path from the high phase to the low phase input channels 118, 120, 122 and 124, thereby recharging the ripple voltage of the low phase capacitors such as 128 of the first stage of voltage depleted during their former conduction (high) periods. In region 90, comprising stages 2 through 5 of capacitor-diode cells identical to cell 102 (as are the region 88 cells) current will flow to the capacitor output side to recharge each capacitor of a low phased string from the charged capacitors of the preceding stage. The discharging capacitors such as phase 3 stage three capacitor 130 of high phased third capacitor string will send current forward to input 104 of stage 4 which will flow through diode 108 and through the diode 132 of the assumed low phased fourth capacitor string to charge its stage 4 capacitor 134. In this way, during nondischarging phases, the capacitors of a string associated with a low phased output of power stage 22 will be successively recharged to compensate for the loss of charge during the previous half-cycle. In a steady state condition, the charge removed from a capacitor during the high phase period of its string is returned to it during the low phase period of its string. As in the case of the matrix, the high phased stage 5 capacitors will discharge through output diodes 94, 96, 98, 100 of region 92 to constitute $I_L$.

Figure 5:
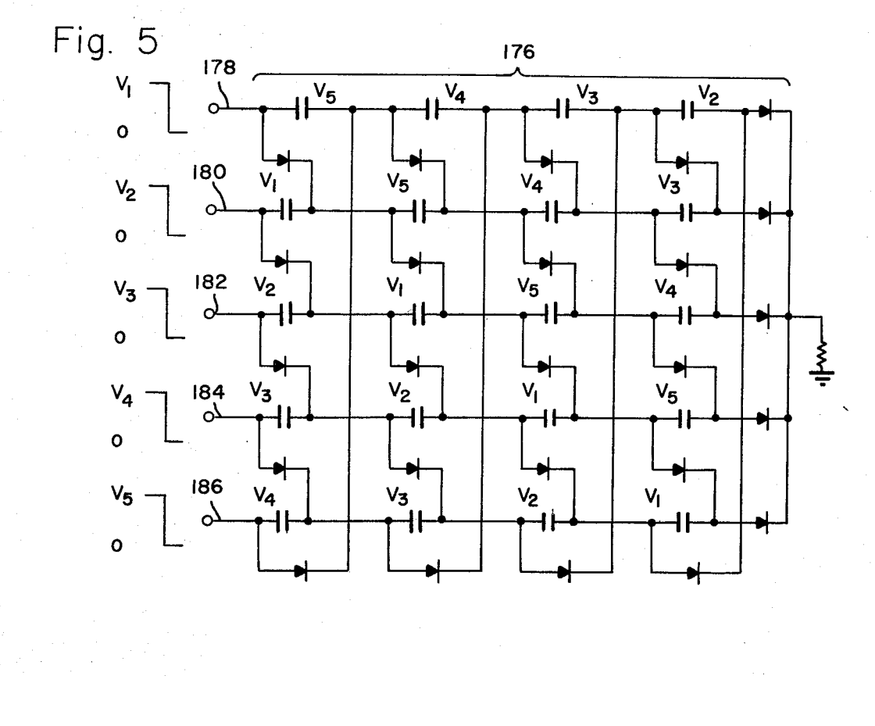
FIG. 5 is a circuit diagram of the five-phase, four-stage ring-type CDVM of the present invention with capacitor voltages indicated thereon.

Finally, in FIG. 4 there is shown the "ring" configuration 136 of the present invention. The ring 136 may be thought of as the reduction of the partial matrix, discussed supra, to a single diode interconnection. That is, each ring cell such as the phase 3, stage 3 cell 138 comprises a capacitor 140 connected across cell input 142 and output 144 and one diode 146 connected across input 142 and the output 148 of phase 4, stage 3 capacitor 150 (alternatively, stated input 152 of phase 4, stage 4 capacitor 154). The further interconnection of the fifth phase capacitor string with the first phase capacitor string gives the circuit its characteristic "ring" appearance, allowing the charge of the phase 4, stage 3 capacitor 150 to be transferred to the phase 1, stage 4 capacitor 156 (assuming phase 4 high, phase 1 low) through diode 158 and bus 160. As this configuration utilizes one diode per cell, a four-phase, five-stage ring CDVM achieves further economy of circuit elements than the prior configurations, requiring a total of 24 (general case, N(M+1)) diodes after account is taken for the output diodes 162, 164, 166 and 168 of the circuit. As in the prior examples of FIGS. 2 and 3, the ring 136 of FIG. 4 may be analyzed in terms of three regions. Input region 170 interfaces with the four-phase power stage 22, intermediate region 172 represents the stages 2 through 5 of four cells each and output region 174 represents the output diodes 162, 164, 166 and 168. The result of the ring's limited number of interconnections is that charge stored upon a capacitor may be transferred forward only to the capacitor of the following stage and phase. Such limitation is reflected in both advantages and disadvantages with respect to the other generalized CDVM multiphase circuits. A significant advantage of the ring 136 geometry is that current sharing may be assured among the outputs of voltage driver 22 when a plurality of voltage pulses of varying amplitude $V_j$ are applied. The limited stage and string interconnections allow one to trace the charging path for any capacitor to its power stage 22 output. Current sharing may be illustrated by FIG. 5 where there is shown a five-phase, four-stage ring CDVM 176. Input voltages are shown as $V_1$, $V_2$, $V_3$, $V_4$ and $V_5$ and the steady state capacitor voltages appearing on the capacitors of the ring are indicated. As can be seen from FIG. 5, this variation of the generalized N-by-M ring configuration results in the sum of the voltages in a given string being equal regardless of the positive going amplitudes of the individual input voltages. Therefore, the path to ground will be identical from any of the five input channels 178, 180, 182, 184 and 186. This will result in efficient power stage utilization and assure current sharing among the five phases. The result may be generalized to the case of any ring configuration of N phases and k(N−1) stages where k is an integer and each phased input voltage has a common low level, (shown as ground in FIG. 5).

Figure 6:
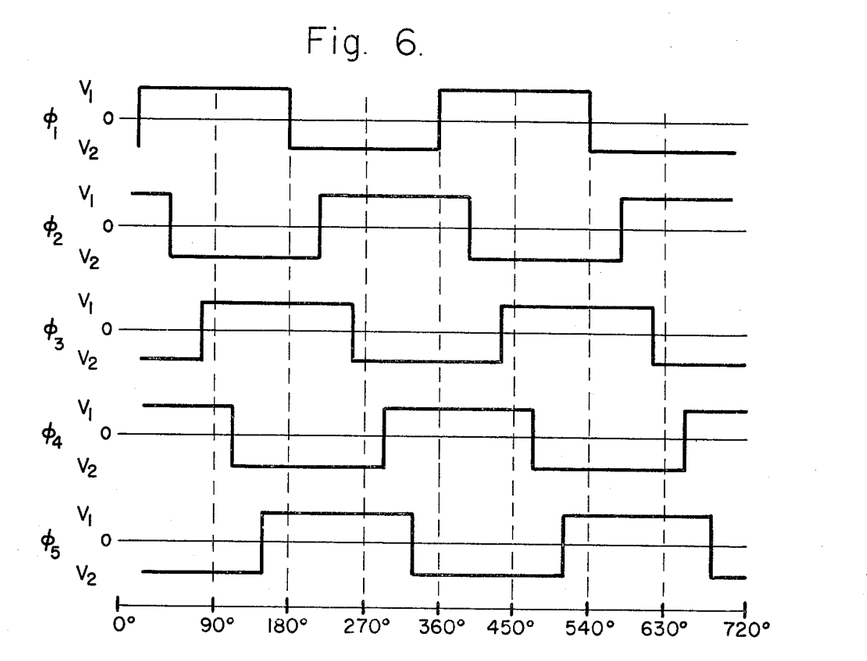
FIG. 6 is a phasing diagram of the optimal sequence for the five-phase ring CDVM of the present invention.

The limited string and stage interconnections makes the ring CDVM circuit sensitive to phase rotation. A phasing sequence should therefore be chosen with respect to the ring to maximize the time per cycle that the $(j^{th})$ string is high relative to the $(j+1)^{th}$ string (and $N^{th}$ string is high relative to the first string) to maximize the charging time of the circuit's capacitors, minimizing the system's charging currents. Such phasing to maximize the conduction duty cycle is shown in FIG. 6 for the case of a five-phase ring CDVM. Alternate phases are (180+360/N) degrees or 252 degrees apart. In practice, inductors in series with the power stage output lines insure that current flows during the full conduction interval. Such phasing may be extended to the N phase ring CDVM to maximize the capacitor charging duty cycle.

Figure 7:
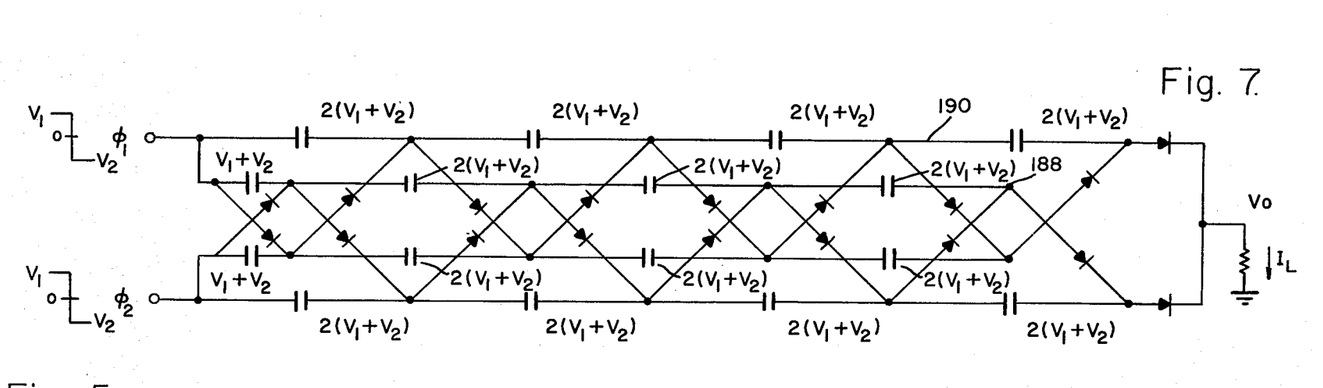
FIG. 7 is a circuit diagram of an alternate two phase ring configuration showing system capacitor voltages.

Although the capacitor strings of multiphase CDVM configurations discussed to this point comprise a serial array of capacitors in which the output or right hand side of the stage i capacitor of string phase j is engaged to the input or left hand side of the stage i+1 capacitor of string phase j, other capacitor arrays are possible and contemplated within the scope of the present invention. For instance, any serial capacitor string may be reconfigured by connection of the input side of a stage i capacitor to any voltage node which is constant with respect thereto (to avoid placing an ac voltage on the capacitor). Such a node will exist at all points in phase with the capacitor's voltage. This, of course, occurs at all points whose phase is determined simultaneously with the capacitor. All points along a string j share the same phasing. Thus, the input or left hand side of any stage i capacitor may be connected to the output or right hand side of any k stage capacitor of the same serial capacitor string (i>k) without altering the function of the multiphase CDVM. This neutral transformation leads to a family of configurations which may efficiently utilize higher rated capacitors than those of FIGS. 2 through 4. They are designed for steady state dc capacitor voltages which are a multiple of $(V_1+V_2)$. In FIG. 7 there is shown a two-phase ring CDVM circuit which operates with a steady state voltage of $2(V_1+V_2)$ across all capacitors except those of the first stage. Each phase string of the ring CDVM comprises the parallel combination of an inner line of capacitors 188 and an outer line of capacitors 190 (string of phase 1, vice versa for the string of phase 2). The circuit operates as the other ring circuits described supra. The dc output voltage for this multiphase CDVM is the same as that of any two-phase ring circuit having the same number of capacitors in serial connection.

It may be verified that the multiphase CDVM of the present invention does in fact achieve voltage multiplication. As in the case of the single phase CDVM, output voltage multiplication results from the serial combination of voltages stored upon the ground reference string of capacitors. In the steady state, capacitors in the input regions of each of the multiphase arrays of FIGS. 2 through 4 are charged directly from the power stage 22 to $V_1+V_2$. In the intermediate regions, capacitors of high strings are parallel connected with succeeding stage capacitors of low strings. Since, in the input regions, capacitors are charged to $V_1+V_2$ and subsequently parallel connect with capacitors in the intermediate regions, all capacitors of all multiphase CDVM's will be charged to $V_1+V_2$ (assuming that capacitor ripple voltages are much lower than capacitor dc voltages). In the output regions, the currents of the high strings sum to the load current $I_L$ through the conducting output diodes. Therefore, the output voltage $V_o$ for each of the multiphase CDVM's of FIGS. 2 through 4 is $V_1+5(V_1+V_2)$. Each of the multiphase CDVM's shown may be easily modified to yield an output voltage $V_o$ that is $5(V_1+V_2)$, if such a multiplication factor should be desirable. The basic cell of each configuration remains the same. The anodes of the input region diodes are tied to ground rather than to the outputs of driver 22. This will result in a steady state voltage across input region capacitors of $V_2$ which, when added to the serial combination of the four capacitors charged to $V_1+V_2$ and the high input voltage $V_1$, will sum to $5(V_1+V_2)$. Similar transformations may be made to M-stage CDVMs to achieve an output voltage of $M(V_1+V_2)$. Thus, it may be seen that the present phased arrangements effect voltage multiplication.

Figure 1B:
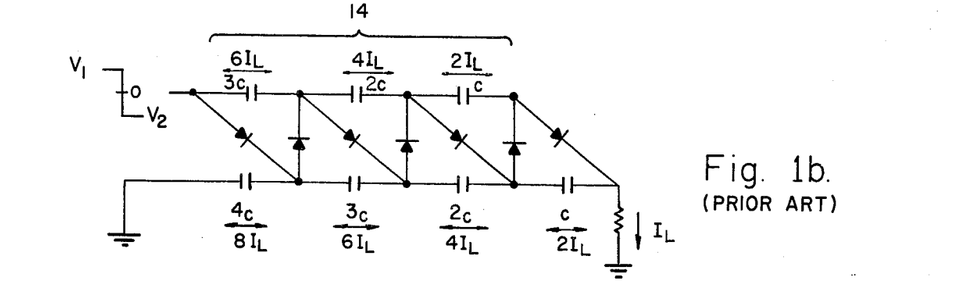
FIG. 1b is a circuit diagram of the prior art single phase CDVM having an output multiplication of $V_1 + 3(V_1 + V_2)$.

The substantial improvement in the power/weight ratio which is accomplished by the multiphase CDVM may be traced to the fact that, on the average over an entire cycle, only $1/N$ of load current $I_L$ passes through each output diode of any multiphase configuration (of course, during conduction, twice this amount will pass through a given output diode). This is due to the fact that the output diodes of all configurations enter, in effect, a summing junction before passing to the load. An imbalance in output current will result in an uneven discharge among fifth or final stage capacitors, tending to reverse, or "average out" the uneven current flow on the next conduction cycle. That is, part of the recharging voltage which might have been utilized as ripple will be "consumed" to replenish the normal steady state voltage of the capacitor of stage five. Thus, a steady flow through each output diode of $I_L/N$ may be assured over a cycle. In contrast, as indicated by FIG. 1b, the current flow in all single phase CDVM diodes will average $I_L$ over an entire cycle and $2I_L$ during conduction. This flow is necessary to recharge the discharging last stage capacitor which supplies the load current $I_L$.

An obvious reduction in component count over the use of N of the single phased CDVM's, of FIGS. 1a and 1b, is readily apparent from a comparison of the multi- and single phase CDVM's in view of the use of two capacitors per stage per phase by the single phase CDVM's of FIGS. 1a and 1b. Twice the number of capacitors is required per stage to achieve the same current handling capability by N single phase CDVM's as by the multistage CDVM's of FIGS. 2 through 4, each of which utilizes one capacitor per stage per phase.

It may also be shown that the multiphase CDVM requires less total capacitance for a given multiplication ratio and output ripple voltage than the single phase CDVM. For example, consider the two phase CDVM of FIG. 8. This is to be compared with the single phase CDVM of the same multiplication ratio of FIG. 1b. In each instance, the equilibrium current flows are as indicated on the figures through the various phased strings and stages of the circuits. As mentioned supra, any diode will conduct only through half the input voltage cycle. The current flows indicated are the conduction, rather than full cycle (average) flows.

Figure 8:
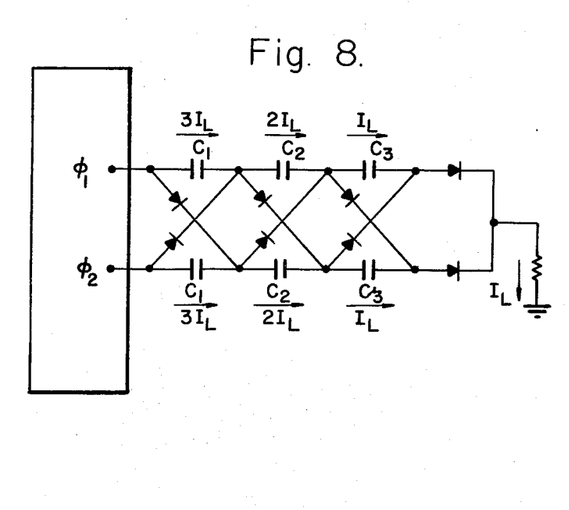
FIG. 8 is a circuit diagram of a two-phase three-stage ring CDVM of the present invention with circuit parameters illustrated thereon for purposes of comparison of this circuit to the single phase CDVM of the prior art of FIG. 1b.

From beginning to end of a conduction cycle, $\Delta T$, the ripple voltage, $\Delta V$, on the last stage capacitor of FIG. 8 is:

$$\frac{I_L}{C_3} \Delta T = \frac{I_L}{C_3} \left(\frac{1}{2f}\right)$$

The ripple voltage on the second stage capacitor is:

$$\frac{2I_L \Delta T}{C_2} = \frac{2I_L}{C_2} \left(\frac{1}{2f}\right)$$

And the $\Delta V$ on the first capacitor is:

$$\frac{3I_L}{C_1} \Delta T = \frac{3I_L}{2C_1 f}$$

The total ripple voltage is then the sum of the above terms or:

$$\frac{I_L}{2f} \left(\frac{1}{C_3} + \frac{2}{C_2} + \frac{3}{C_1}\right)$$

Assuming that the capacitors of the multiphase CDVM and scaled for equal ripple voltages, $C_1 = 3C_3$, $C_2 = 2C_3$. Therefore the total ripple voltage is:

$$\frac{I_L}{2F} \left(\frac{1}{C_3} + \frac{2}{2C_3} + \frac{3}{3C_3}\right) = \frac{3I_L}{2C_3 F}$$

solving for $$C_3 \left(= \frac{3I_L}{2f\Delta V}\right),$$

the total capacitance for the two-phase CDVM of FIG. 8 corresponding to a given ripple voltage, $\Delta V$, will be:

$$2(C_3 + 2C_3 + 3C_3) = 12 C_3 \frac{18 I_L}{f\Delta V}$$

Making the same assumptions previously made in deriving the output ripple voltage of a two-phase system, the output ripple voltage over a given half cycle for the single phase system of FIG. 1b may be similarly derived. Assuming for example that the capacitors are scaled for equal ripple voltages as shown in FIG. 1b, and observing the current flows as indicated in FIG. 1b, the total ripple voltage for a single phase CDVM of the same multiplication ratio as the two-phase CDVM of FIG. 8 is:

$$\frac{8I_L}{4C}\left(\frac{1}{2f}\right) + \frac{6I_L}{3C}\left(\frac{1}{2f}\right) + \frac{4I_L}{2C}\left(\frac{1}{2f}\right) + \frac{2I_L}{C}\left(\frac{1}{2f}\right) =$$
$$\frac{4I_L}{Cf} \text{ therefore, } C = \frac{4I_L}{\Delta V f}$$

The total capacitance as shown in FIG. 1b equals:

$$4C + 2(3+2+1) \times C = 16C$$

Therefore, for a given $\Delta V$, the one-phase CDVM requires a total capacitance of $$16 \left(\frac{4I_L}{f\Delta V}\right) = \frac{64 I_L}{f\Delta V}$$

Comparing the total capacitance of the two systems, the two-phase system requires only 0.28 times the total capacitance of the one-phase system for the same output ripple voltage. Thus, in addition to the fact that it has been shown that the diodes of the end phase CDVM must carry only $(1/N)$ of the current carried by diodes of the single phase system, it is also shown that only a fractional amount of total capacitance (which will be proportional to weight) must be used in the multiphase system to supply a given load current at a given output ripple voltage. These qualities provide a significantly increased power handling capability per unit of weight for the multiphase CDVM of the present invention over the single phase CDVM of FIGS. 1a and 1b.

In general, the multiphase CDVM's are tolerant to capacitor failures if the capacitors are rated at two times the normal operating voltage. It has been found that, if a capacitor shorts, current sharing between strings will be somewhat impaired but the multiphase CDVM's still function adequately as voltage multipliers. In terms of system reliability, this means that the number of single point failures has been reduced. Furthermore, the ring configuration's great economy of diodes (compared with N single phase CDVM's) enhances system reliability.

Thus there is shown a multiphase capacitor diode voltage multiplier designed to achieve a significant increase in power handling capability per unit of weight over present day capacitor diode multipliers. Various changes and modifications may be made without departing from the spirit of the invention, and all of such changes are contemplated as may come within the scope of the claims.

What is claimed is:

1. A multiphase voltage multiplier which comprises:
   (a) means for producing an output comprising at least three voltages, each of said voltages alternating between a high level and a low level and differing in phase;
   (b) a capacitor-diode multiplier circuit having at least three input channels and an output junction;
   (c) said multiplier circuit comprising N circuit strings, each of said strings being in electrical connection with an input channel and the output junction;
   (d) each of said input channels of said circuit being in electrical connection with said means;
   (e) each of said strings of said multiplier circuit comprising M stages;
   (f) each of said stages having an input and an output, one of said strings being string j and one of said stages being stage i, the output of stage i of circuit string j being in electrical connection with the input of stage (i+1) of circuit string j;
   (g) an output diode connecting the output of the final stage of each string to the output junction of the multiphase voltage multiplier; and
   (h) each stage i of each circuit string j comprising (1) a capacitor connected across said input and said output of said stage i of said string j, (2) a diode connected from said input of said stage i of said string j to the input of stage (i+1) of string (j+1) and (3) a diode connected from the input of said stage i of string N to the input to stage (i+1) of string 1.

2. A multiphase voltage multiplier as defined in claim 1 wherein said means produces N voltages, each of said voltages differing in phase by (180+360/N) degrees.

3. A multiphase voltage multiplier which comprises:
   (a) means for producing an output comprising at least three voltages, each of said voltages alternating between a high level and a low level and differing in phase;
   (b) a capacitor-diode multiplier circuit having at least three input channels and an output junction;
   (c) said multiplier circuit comprising N circuit strings, each of said strings being in electrical connection with an input channel and the output junction;
   (d) each of said input channels of said circuit being in electrical connection with said means;
   (e) each of said strings of said multiplier circuit comprising M stages;
   (f) each of said stages having an input and an output, one of said strings being string j and one of said stages being stage i, the output of stage i of circuit string j being in electrical connection with the input of stage (i+1) of circuit string j;
   (g) an output diode connecting the output of the final stage of each string to the output junction of the multiphase voltage multiplier; and
   (h) each stage i of each circuit string j comprising (1) a capacitor connected across said input and said output of said stage i of said string j and (2) additionally comprising (N−1) diodes, each of said diodes connected from said input of said stage i of said string j to the output of one other string of stage i whereby each string of stage i is interconnected to string j.

4. A multiphase voltage multiplier as defined in claim 3 wherein each stage i of each circuit string j comprises (N−1−X) diodes, X being an integer less than N, connected from said input of said stage i of said string j to the output of all but X of the strings of stage i whereby a partial interconnection of the strings of stage i is achieved.

5. A multiphase voltage multiplier which comprises:
   (a) means for producing an output comprising at least four voltages, each of said voltages alternating between a high level and a low level and differing in phase;
   (b) a capacitor-diode multiplier circuit having at least four input channels and an output junction;
   (c) said multiplier circuit comprising N circuit strings, each of said strings being in electrical connection with an input channel and the output junction;
   (d) each of said input channels of said circuit being in electrical connection with said means;
   (e) each of said strings of said multiplier circuit comprising M stages;
   (f) each of said stages having an input and an output, one of said strings being string j and one of said stages being stage i, the output of stage i of circuit string j being in electrical connection with the input of stage (i+1) of circuit string j;
   (g) an output diode connecting the output of the final stage of each string to the output junction of the multiphase voltage multiplier; and
   (h) each stage i of each circuit string j comprising (1) a capacitor connected across said input and said output of said stage i of said string j, (2) a stage i bus and (3) a first diode and a second diode, said first diode connected to conduct current from said input of said stage i to the stage i bus and said second diode connected to conduct current from the stage i bus to the output of stage i.

6. A multiphase voltage multiplier which comprises:
   (a) means for producing an output comprising at least four voltages, each of said voltages alternating between a high level and a low level and differing in phase;
   (b) a capacitor-diode multiplier circuit having at least four input channels and an output junction;
   (c) said multiplier circuit comprising N circuit strings, each of said strings being in electrical connection with an input channel and the output junction;
   (d) each of said input channels of said circuit being in electrical connection with said means;
   (e) each of said strings of said multiplier circuit comprising M stages;
   (f) each of said stages having an input and an output, one of said strings being string j and one of said stages being stage i, the output of stage i of circuit string j being in electrical connection with the input of stage (i+1) of circuit string j;
   (g) an output diode connecting the output of the final stage of each string to the output junction of the multiphase voltage multiplier; and
   (h) each stage i of each circuit string j comprising (1) a capacitor connected across said input and said output of said stage i of said string j, (2) a stage i bus and (3) a first diode and a second diode, said first diode connected to conduct current from said stage i bus to the input of stage i and said second diode connected to conduct current from the output of stage i to the stage i bus.

7. A multiphase voltage multiplier which comprises:
(a) means for producing an output comprising two voltages, each of said voltages alternating between a high level and a low level and differing in phase;
(b) a capacitor-diode multiplier circuit having two input channels and an output junction;
(c) said multiplier circuit comprising a first circuit string and a second circuit string, each of said strings being in electrical connection with an input channel and the output junction;
(d) each of said input channels of said circuit being in electrical connection with said means;
(e) each of said strings of said multiplier circuit comprising M stages;
(f) each of said circuit strings comprises an inner line of capacitors and an outer line of capacitors, said inner line of capacitors of said first circuit string and said outer line of capacitors of said first string in electrical connection with a first output of said means and said inner line of capacitors of said second circuit string and said outer line of capacitors of said second circuit string in electrical connection with a second output of said means;
(g) an inner node i is located between each capacitor i and capacitor (i+1) of each inner line and an outer node i is located between each capacitor i and capacitor (i+1) of each outer line;
(h) a first diode is located across said first output of said means and inner node 1 of said second circuit string;
(i) a second diode is located across said second output of said means and inner node 1 of said first circuit string;
(j) a first plurality of diodes, each of said diodes connecting an inner node i of said first circuit string to outer node i of said second circuit string;
(k) a second plurality of diodes, each of said diodes connecting an inner node i of said second circuit string to outer node i of said first circuit string;
(l) a third plurality of diodes, each of said diodes connecting an outer node i of said second circuit string to inner node (i+1) of said first circuit string;
(m) a fourth plurality of diodes, each of said diodes connecting an outer node i of said second circuit string to inner node (i+1) of said second circuit string; and
(n) a pair of output diodes, each of said diodes connected across an outer line of capacitors and said output junction.

8. An M-stage, N-string capacitor diode multiplier circuit having at least three input channels and an output junction which comprises:
(a) at least three circuit strings, each string having an input channel;
(b) each of said strings of said multiplier circuit comprising M-stages;
(c) each of said stages having an input and an output, one of said strings being string j and one of said stages being stage i, the output of stage i of circuit string j being in electrical connection with the input to stage (i+1) of circuit string j;
(d) an output diode connecting the output of the final stage of each string to the output junction of the multiplier circuit;
(e) each stage i of each string j comprising (1) a capacitor connected across said input and said output of said stage i of said string j,(2) a diode connected from said input of said stage i of said string j to the input of stage (i+1) of string (j+1) and (3) a diode connected from the input of said stage i of string N to the input to stage (i+1) of string 1.

9. An M-stage, N-string capacitor-diode multiplier circuit having at least three input channels and an output junction which comprises:
(a) at least three circuit strings, each string having an input channel;
(b) each of said strings of said multiplier circuit comprising M-stages;
(c) each of said stages having an input and an output, one of said strings being string j and one of said stages being stage i, the output of stage i of circuit string j being in electrical connection with the input to stage (i+1) of circuit string j;
(d) an output diode connecting the output of the final stage of each string to the output junction of the multiplier circuit;
(e) each stage i of each string j comprising (1) a capacitor connected across said input and said output of said stage i of said string j; and (2) additionally comprising (N−1) diodes, each of said diodes connected from said input of said stage i of said string j to the output of one other string of stage i whereby each string of stage i is interconnected to string j.

10. An M-stage capacitor diode multiplier circuit as defined in claim 9 wherein each stage i of each circuit string j comprises (N−1−X) diodes, X being an integer less than N, connected from said input of said stage i of said string j to the output of all but X of the strings of stage i whereby a partial interconnection of the strings of stage i is achieved.

11. An M-stage, N-string capacitor diode multiplier circuit having at least four input channels and an output junction which comprises:
(a) at least four circuit strings, each string having an input channel;
(b) each of said strings of said multiplier circuit comprising M-stages;
(c) each of said stages having an input and an output, one of said strings being string j and one of said stages being stage i, the output of stage i of circuit string j being in electrical connection with the input to stage (i+1) of circuit string j;
(d) an output diode connecting the output of the final stage of each string to the output junction of the multiplier circuit;
(e) each stage i of each circuit string j comprising (1) a capacitor connected across said input and said output of said stage i of said string j, (2) a stage i bus and (3) a first diode and a second diode, said first diode connected to conduct current from said input of said stage i to the stage i bus and said second diode connected to conduct current from the stage i bus to the output of stage i.

12. An M-stage, N-string capacitor diode multiplier circuit having at least four input channels and an output junction which comprises:
(a) at least four circuit strings, each string having an input channel;
(b) each of said strings of said multiplier circuit comprising M-stages;

(c) each of said stages having an input and an output, one of said strings being string j and one of said stages being stage i, the output of stage i of circuit string j being in electrical connection with the input to stage (i+1) of circuit string j;
(d) an output diode connecting the output of the final stage of each string to the output junction of the multiplier circuit;
(e) each stage i of each circuit string j comprising (1) a capacitor connected across said input and said output of said stage i of said string j, (2) a stage i bus and (3) a first diode and a second diode, said first diode connected to conduct current from said stage i bus to the input of stage i and said second diode connected to conduct current from the output of stage i to the stage i bus.

13. A capacitor-diode voltage multiplier circuit having a first input channel, a second input channel and an output junction which comprises:
(a) a first circuit string and a second circuit string;
(b) each of said circuit strings comprising an inner line of capacitors and an outer line of capacitors, said inner line of capacitors of said first circuit string and said outer line of capacitors of said first string in electrical connection with said first input channel and said inner line of capacitors of said second circuit string and said outer line of capacitors of said second circuit string in electrical connection with said second input channel;
(c) an inner node i is located between each capacitor i and capacitor (i+1) of each inner line and an outer node i located between each capacitor i and capacitor (i+1) of each outer line;
(d) a first diode is located across said first input channel and inner node 1 of said second circuit string;
(e) a second diode is located across said second input channel and inner node 1 of said first circuit string;
(f) a first plurality of diodes, each of said diodes connecting an inner node i of said first circuit string to outer node i of said second circuit string;
(g) a second plurality of diodes, each of said diodes connecting an inner node i of said second circuit string to outer node i of said first circuit string;
(h) a third plurality of diodes, each of said diodes connecting an outer node i of said second circuit string to inner node (i+1) of said first circuit string;
(i) a fourth plurality of diodes, each of said diodes connecting an outer node i of said first circuit string to inner node (i+1) of said second circuit string; and
(j) a pair of output diodes, each of said diodes connected across an outer line of capacitors and said output junction.

* * * * *